United States Patent [19]

Lucy

[11] Patent Number: 5,091,486
[45] Date of Patent: Feb. 25, 1992

[54] PREPARATION OF POLYACETALS/CYCLIC ACETALS FROM POLYKETONE

[75] Inventor: Andrew R. Lucy, Surrey, England

[73] Assignee: The British Petroleum Company p.l.c., London, England

[21] Appl. No.: 550,478

[22] Filed: Jul. 10, 1990

[30] Foreign Application Priority Data

Jul. 18, 1989 [GB] United Kingdom ............... 8916391

[51] Int. Cl.$^5$ ................................. C08G 67/02
[52] U.S. Cl. .................... 525/539; 528/392; 528/488; 528/493; 528/494; 528/495; 528/496; 528/499
[58] Field of Search ............. 525/539; 528/392, 488, 528/493, 494, 495, 496, 499

[56] References Cited

U.S. PATENT DOCUMENTS 4,826,932 5/1989 Wong ................................. 525/539

Primary Examiner—Harold D. Anderson
Attorney, Agent, or Firm—Brooks Haidt Haffner & Delahunty

[57] ABSTRACT

A process for preparing polyacetals having less than 10% by weight carbonyl containing units and in which the molar ratio of acetal to furan units is greater than or equal to 15:1 is provided. The process comprises reacting a linear alternating polymer of carbon monoxide with one or more olefins (polyketone) with a diol at elevated temperature in the presence of an acid e.g. para-toluenesulphonic acid while continuously removing water generated by the reaction. Water is preferably removed by azeotropic distillation using a water-immiscible solvent.

9 Claims, No Drawings

PREPARATION OF POLYACETALS/CYCLIC ACETALS FROM POLYKETONE

The present invention relates to new polyacetals and processes for their preparation.

European patent 121965 discloses a class of linear alternating polymers prepared by polymerising carbon monoxide with one or more olefins. The process for preparing such polymers, which are now known in the art as polyketones, involves carrying out the polymerisation of the reactants in an alcohol solvent in the presence of a palladium catalyst, an anion of an acid having a pKa of less than 2 and preferably a chelate phosphine. The anion is one which will either not coordinate or will only weakly coordinate with palladium.

Australian patent application 26909/88, which was published on 29th June 1989, teaches that such polyketones can be derivatised by treatment with a vicinal diol and/or a primary amine. The derivatised reaction product is characterised by random distribution along the polymer chain of a units of carbonyl groups, b units of pyrrole or furan groups, c units of acetal groups and d units of imine groups such that a, c and d are greater than or equal to zero, b is greater than zero and the ratio $a:(a+b+c+d)$ is less than 0.33. In the case where the polyketone has been derivatised with only a vicinal diol $d=0$, the b units are exclusively furan groups and the ratio of c:b (i.e. acetal to furan groups) is greater than or equal to 2 preferably greater than or equal to 8.

Australian patent application 26909/88 also describes a process for derivatising the polyketone with a vicinal diol which comprises refluxing the polyketone and vicinal diol together in toluene solvent in the presence of an acid catalyst.

A problem arises with the process described above if the object is to make derivatives containing only acetal groups, e.g. no furan groups, present. It is found that simply refluxing the polyketone and diol together in a solvent always produces materials in which significant numbers of groups other than acetals are present. Typically the mole ratio of acetal to other groups in such materials is considerably less than 15:1.

A modified version of the process described in Australian patent application 26909/88 is now provided which produces derivatives consisting of essentially only acetal groups with only small numbers of other groups e.g. furan or residual carbonyl groups.

According to the present invention there is provided a process for preparing a polyacetal comprised of one or more types of acetal unit of formula:

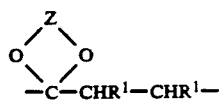
(I)

and containing less than 10% by weight of groups of formula:

with the proviso that the molar ratio of total acetal units of formula (I) to furan groups of formula:

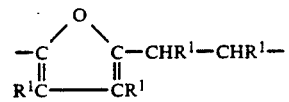
(II)

is greater than or equal to 15:1, which process comprises the steps of:

(a) reacting a linear alternating polymer of carbon monoxide and one or more olefins with a diol at elevated temperature in the presence of an acid catalyst, and (b) continuously removing from the reaction medium water generated by the reaction occurring in step (a).

It is found that by continuously removing water from the acetalisation reaction as it is produced the number of furan groups can be reduced and under certain conditions essentially eliminated. Such a process therefore has the advantage that it is more reproducible ensuring that the polyacetal product is in turn more reproducible in terms of its performance.

The polyacetals produced by the process defined above are useful as adhesives for metal and glass and will find use in the production of glass laminates. Furthermore it has been found that the polyacetals are stable, and melt at relatively low temperatures without apparent decomposition, unlike the corresponding polyketones which in general decompose significantly on melting. Furthermore, the polyacetals are readily soluble in a range of solvents for example toluene, chloroform and dichloromethane. By contrast polyketones are soluble only in expensive solvents such as hexafluoroisopropanol or high boiling solvents such as meta-cresol.

As regards the acetal groups of formula (I) which comprise the polyacetal, the $R^1$ groups are independently selected from H or $C_1$ to $C_{10}$ alkyl or phenyl. It is most preferred that $R^1$ groups are selected H or from $C_1$ to $C_4$ alkyl or phenyl, most preferably H or methyl. It will be appreciated that the polyacetal can be comprised exclusively of one type of unit of formula (I) in the case where the polyketone precursor is a copolymer of carbon monoxide and a single olefin (e.g. ethylene) or it can be comprised of a number of such units as would be the case where the polyketone precursor is a terpolymer of for example carbon monoxide, ethylene and propylene.

Turning to the diol, this has the formula HOZOH wherein Z is a divalent group having the formula $-(C(R)_2)_n-$ where R can be independently selected from H, OH and $C_1$ to $C_{10}$ alkyl or hydroxyalkyl and n is 2 to 6. Preferred R groups are H, OH, $C_1$ to $C_6$ alkyl or hydroxyalkyl and n is preferrably 2 to 4. Most preferred examples are where Z is such that the diol is vicinal (i.e. 1,2-substituted). Example of most preferred Z groups include $-CH_2-CH(CH_3)-$; $-CH_2CH(C_2H_5)-$ or $-CH_2CH(C_3H_7)-$.

The basic process for preparing the polyacetals defined above comprises the step of acetalising a polyketone with a diol according to the process described in the above-mentioned Australian patent application or in Synthesis (1981) 7 501-522. Such a process involves reacting the polyketone and diol at a temperature in the range 40° to 140° C. in the presence of a suitable acid catalyst for example para-toluenesulphonic acid, dilute mineral acids and the like.

It is a feature of the process of the present invention that this basic process is modified so that water generated by acetalisation is continuously removed. Such continuous removal can be effected by for example having a dehydrating agent, e.g. an orthoformate, present in the reaction medium or by refluxing the reaction medium through a bed of molecular sieve. A preferred method of effecting continuous removal is however to carry out the reaction in a solvent which although immiscible with water forms an azeotrope therewith. Preferred examples of such solvents include benzene, toluene and xylene. Using such a solvent separation by azeotropic distillation can be effected using conventional apparatus (e.g. a Dean-Stark trap and condenser).

If water is to be removed by azeotropic distillation it is preferred to carry out the reaction at or near the boiling point of the relevant azeotrope. Such azeotropes typically boil in the range 75° to 150° C. at atmospheric pressure.

In an embodiment of the present invention it has been found that in order to obtain very low numbers of furan groups in the polyacetal the molar ratio of CO groups in the polyketone to diol should be in the range 1:2 to 1:50 preferably 1:10 to 1:40.

The preparation of the polyketone used in the process of the present invention has been briefly described above. More details of preferred process for its manufacture are to be found in EP 121965 and EP 213671. Preferred polyketones which are very suitable for acetalisation include those which are either copolymers of carbon monoxide and ethylene or terpolymers of carbon monoxide, ethylene and an alpha-olefin selected from propylene but-1-ene, pent-1-ene, hex-1-ene and styrene. The molecular weight of the polyketone used is suitably in the range 1000-200,000 preferably 6000-150,000.

Finally it is believed that the polyacetals prepared by the process of the present invention are themselves new and accordingly, therefore, they are provided by an embodiment of the present invention. In such materials the molar ratio of acetal to furan groups can readily be determined by $^{13}C$ or $^{1}H$ NMR spectroscopy.

The following examples illustrate the invention.

A: Preparation of Polyketone derived from ethylene and CO

A precursor solution was prepared by boiling a mixture of palladium acetate (27 mg) 1,3 bis-(diphenylphosphino) propane (68 mg), dimethylformamide (0.01 cm$^3$) and methanol (10 cm$^3$) until a homogenous solution was obtained. The mixture was cooled and filtered.

A stainless steel autoclave (300 cm$^3$) was charged with 0.599 g of $H[B(OC_6H_4CO_2)_2]$ as described in EP 314309 and 100 cm$^3$ of methanol and then after sealing purged with a 1:1 mixture of CO and ethylene to remove air. The vessel was then pressurised to 2.5 MPa with the 1:1 mixture and thereafter heated with stirring to 100° C. whilst the contents were stirred. On reaching temperature, the catalyst solution was injected into the vessel and the pressure raised further to 5 MPa using the same 1:1 mixture.

The reaction temperature was maintained at 100° C. and a pressure of 5 MPa bar maintained by applying a continuous feed of the gaseous mixture for four and a half hours. The vessel was then cooled, opened and the polymer collected by filtration of the reaction mixture. The polymer was then washed sequentially with methanol and acetone and dried to constant weight. A yield of 27.37 g of product was obtained.

B: Preparation of the Polyketone derived from ethylene, propylene and CO

A catalyst precursor solution was prepared by boiling a mixture of palladium acetate (25.4 mg) and 1,3-bis(diphenylphosphino)propane (66.8 mg) in methanol (10 cm$^3$) until a homogenous solution was obtained. The mixture was cooled and filtered.

A stainless steel autoclave (300 cm$^3$) was charged with 1.6 g of $H[B(OC_6H_4CO_2)]$, p-benzoquinone (2 g), methanol (70 cm$^3$) and propylene (27.5 g). The vessel was sealed and pressured to 2.5 MPa with a 1:1 mixture of ethylene and carbon monoxide and then heated, with stirring, to 70° C. The catalyst solution was injected and the pressure increased to 50 bar with the same gaseous mixture.

On reaching temperature 5 MPa the reaction temperature was maintained at 70° C. and a pressure of 50 bar maintained by a continuous feed of the 1:1 mixture for one hour. The vessel was cooled, opened and the polymer collected by filtration of the reaction mixture. The polymer was then washed sequentially with methanol and acetone and dried to constant weight. A yield of 0.7 g of product was obtained.

EXAMPLE 1

A 250 cm$^3$ round bottom flask containing a magnetic stirrer, was charged with 1.0 g of the ethylene/CO polyketone, described in A above, para-toluenesulphonic acid (20 mg), xylene (100 cm$^3$) and ethyleneglycol (50 cm$^3$). The flask was then fitted with a Dean-Stark trap and condenser. The reaction mixture was stirred and boiled under reflux for two hours. It was then cooled and poured into 50 cm$^3$ of water containing 0.1 g of NaOH. The precipitate formed was collected by filtration, washed with water and dried to give 1.246 g of polymer. $^{13}C$-NMR Spectroscopy showed the product to be comprised of acetal units of formula I where Z is —$CH_2CH_2$— and $R^1$ and H. The ratio of units of formula (I) to furan units of formula (II) was 300:1.

EXAMPLE 2

A 250 cm$^3$ round bottom flask containing a magnetic stirrer was charged with 1.0 g of ethylene/CO polyketone, prepared as described in A above, para-toluenesulphonic acid (20 mg), toluene (100 cm$^3$) and 1,2-propanediol (50 cm$^3$). The flask was then fitted with a Dean-Stark trap and condenser. The reaction mixture was stirred and boiled under reflux for 90 minutes and then allowed to cool.

The toluene phase was then added to 50 cm$^3$ of water containing 0.1 g of NaOH. The aqueous phase was separated off, the toluene phase washed repeatedly with saturated brine and then dried over magnesium sulphate. The liquors were filtered and evaporated to dryness to give 1.76 g of a clear oil. $^{1}H$-NMR spectroscopy indicated that the oil was comprised of units of formula I where Z is —$CH_2$—$CH(CH_3)$— and $R^1$ are H. The molar ratio of acetal groups of formula (I) to furan groups of formula (II) was greater than 100:1.

EXAMPLE 3

The process of Example 2 was repeated, except that the polyketone described in B above was used and the reaction was maintained for three hours. $^{1}H$-NMR spectroscopy was consistent with the product being comprised of two types of units. The first type of unit was that described in Example 2 together with units of formula I wherein Z was —CH$_2$CH(CH$_3$)— and R$^1$ was H or CH$_3$. The molar ratio of acetal groups of formula (I) to furan groups of formula (II) was greater than 35:1.

COMPARATIVE TEST A

A 100 cm$^3$ round bottom flask containing a magnetic stirrer was charged with the polyketone described in A above, para-toluenesulphonic acid (18 mg), ethane-1,2-diol (1.2 g) and toluene (25 cm$^3$). The mixture was stirred and boiled under reflux for 12 hours, then allowed to cool, filtered and the solution evaporated to dryness. $^{13}$C NMR spectroscopy of this product showed the presence of acetal, furan hemiacetal and carbonyl groups with a molar ratio of 17:11:7:20. This comparative test shows the effect of not continuously removing water from the reaction medium.

EXAMPLE 4

A 250 cm$^3$ round bottom flask containing a magnetic stirrer was charged with 0.5 g of an ethylene/CO polyketone (m.pt 257° C., intrinsic viscosity 1.78 measured in meta-cresol at 60° C.), para-toluenesulphonic acid (26 mg), butane-1,2-diol (25 cm$^3$) and xylene (30 cm$^3$). The flask was then fitted with a Dean-Stark trap and condenser. The reaction mixture was stirred and boiled under reflux for 165 minutes to give a pale yellow solution, then allowed to cool. The xylene phase was separated off and added to a solution of 0.1 g NaOH in 25 cm$^3$ H$_2$O. The aqueous phase was separated off and the xylene phase washed repeatedly with saturated brine, dried over magnesium sulphate, filtered and evaporated to dryness to give a yellow plastic, yield 0.87 g. $^1$H NMR in CDCl$_3$ showed the product to be a polyacetal with a 60:1 acetal:furan molar ratio.

EXAMPLES 5–8

A 250 cm$^3$ round bottom flask fitted with a magnetic stirrer and a Dean-Stark trap and condenser was charged as shown in Table A. The contents were boiled and stirred under reflux for 5 hours, cooled and poured into hexane (400 cm$^3$) to precipitate the product. The liquors were decanted and the product collected by dissolution in CH$_2$Cl$_2$. The CH$_2$Cl$_2$ solution was then evaporated to dryness in vacuo, washed with water, methanol and diethyl ether and re-dried. Product analysis was carried out using $^1$H NMR spectroscopy.

TABLE A

| Example | Polyketone[1] (g) | Propane-1,2-diol-(cm$^3$) | Acetal:Furan Molar Ratio | Colour of Product |
|---|---|---|---|---|
| 5 | 3 | 10 | 27:1 | Brown |
| 6 | 2 | 10 | 32:1 | Dark Orange |
| 7 | 1 | 10 | >40:1 | Orange |
| 8 | 0.5 | 10 | >40:1 | Yellow |

[1]ethylene/CO copolymer:melting point 257° C., intrinsic viscosity of 1.78 (60° C., meta-cresol).

I claim:

1. A process for preparing a polyacetal comprised of one or more acetal unit of formula:

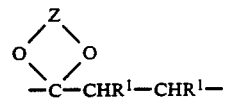

wherein Z is a divalent group having the formula —(C(R)$_2$)$_n$— where the R groups are independently H, OH, C$_1$ to C$_{10}$ alkyl or C$_1$ to C$_{10}$ hydroxyalkyl and n is 2 to 6 and containing less than 10% by weight of groups of formula:

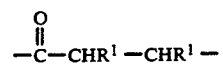

wherein the R$^1$ groups as being independently hydrogen C$_1$ to C$_{10}$ alkyl, or phenyl with the proviso that the molar ratio of total acetal units of formula (I) to furan groups of formula:

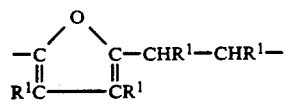

is greater than or equal to 15:1, which process comprises the steps of:
(a) reacting a linear alternating polymer of carbon monoxide and one or more olefins with a diol at elevated temperature in the presence of an acid catalyst, and
(b) continuously removing from the reaction medium water generated by the reaction occurring in step (a).

2. A process as claimed in claim 1 wherein the molar ratio of linear alternating polymer to diol in step (a) is in the range 1:2 to 1:50.

3. A process as claimed in claim 2 wherein the molar ratio of linear alternating polymer to diol in step (a) is in the range 1:10 to 1:40.

4. A process as claimed in claim 1 wherein step (a) is effected in a solvent which is immiscible with water and forms an azeotrope therewith.

5. A process as claimed in claim 4 wherein the solvent is selected from benzene, toluene or xylene.

6. A process as claimed in claim 5 wherein in step (b) water is continuously removed by azeotropic distillation.

7. A process as claimed in claim 1 wherein the linear alternating polymer is either a copolymer of ethylene and carbon monoxide or a terpolymer of ethylene, carbon monoxide and an alpha-olefin selected from the group consisting of propylene, but-1-ene, hex-1-ene and styrene.

8. A process as claimed in claim 1 wherein the diol is a vicinal diol selected from 1,2-propylene glycol, 1,2-butylene glycol and 1,2-pentylene glycol.

9. A process as claimed in claim 1 further comprising the step of isolation and purifying the polyacetal from the product of step (b).

* * * * *

UNITED STATES PATENT AND TRADEMARK OFFICE
CERTIFICATE OF CORRECTION

PATENT NO. : 5,091,486

DATED : February 25, 1992

INVENTOR(S) : Andrew R. Lucy

It is certified that error appears in the above-identified patent and that said Letters Patent is hereby corrected as shown below:

Col. 6, line 56, after "but-1-ene" and before "hex-1-ene" insert --pent-1-ene--

Signed and Sealed this

Fifteenth Day of June, 1993

Attest:

*Attesting Officer*

MICHAEL K. KIRK

*Acting Commissioner of Patents and Trademarks*